United States Patent [19]

Snyder

[11] Patent Number: 4,504,535

[45] Date of Patent: Mar. 12, 1985

[54] FASTENING RING INSERT FOR A MOLDED PLASTIC ARTICLE

[75] Inventor: Larry L. Snyder, Lincoln, Nebr.

[73] Assignee: Snyder Industries, Inc., Lincoln, Nebr.

[21] Appl. No.: 440,620

[22] Filed: Nov. 10, 1982

[51] Int. Cl.³ .................................................. B32B 3/10
[52] U.S. Cl. .................................... 428/137; 411/427; 220/85 R; 248/27.1
[58] Field of Search .................. 428/596, 35, 131, 137, 428/120, 156, 65, 66, 157, 167; 411/427; 248/27.1; 220/85 R, 71, 5 A, DIG. 1, DIG. 23; 264/275

[56] References Cited

U.S. PATENT DOCUMENTS

| | | | |
|---|---|---|---|
| 2,681,377 | 6/1954 | Smithers | 428/167 X |
| 4,274,236 | 6/1981 | Kessler | 428/167 X |
| 4,300,698 | 11/1981 | Williamson | 428/137 X |

Primary Examiner—Alexander S. Thomas
Attorney, Agent, or Firm—Banner, Birch, McKie & Beckett

[57] ABSTRACT

A fastening insert adapted to be molded into the wall of a plastic container in order to provide a flat, fluid-tight sealing surface on the outer surface of the wall. The insert comprises a rigid annular base and a rigid rib which extends axially outward from the base. A plurality of threaded connectors are provided on the insert. The rigid rib and base prevent the plastic material from shrinking and sagging around the connectors during the plastic curing process.

14 Claims, 3 Drawing Figures

FASTENING RING INSERT FOR A MOLDED PLASTIC ARTICLE

BACKGROUND OF THE INVENTION

1. Field of the Invention

This invention relates to an insert adapted to be molded into a molded plastic part in order to effect a fluid-tight seal between the plastic part and another object to which the plastic part is to be fastened. This invention has particular application to providing a fastening ring insert molded into a plastic tank in order to form a leakproof, fluid-tight connection between the tank and an object which closes or communicates with the interior of the tank.

2. Background Art

In many applications, it is necessary for plastic parts, such as fuel tanks, to be able to be readily and repeatedly fastened and unfastened to other objects, yet also be able to maintain a fluid-tight seal when fastened.

Prior art devices, such as that disclosed in U.S. Pat. No. 4,023,257, have used a fastening insert molded into a plastic container. These fastening inserts generally are flat washers or similar devices which contain either male or female connectors. The washers are, for example, an aluminum ring of approximately a 5 inch outer diameter and a 4 inch inner diameter. The washers are connected to the inside of the mold used to form the container. The washer is placed in the mold so that it will form an essentially flat surface, flush with the outside wall of the molded article. During the molding process, the plastic material surrounds or encapsulates the washer and the connectors.

As the molded article is cooled and cured, however, the plastic material tends to shrink around the connectors and form slight depressions between adjacent connectors, thus inhibiting the ability of the insert to maintain a flat sealing surface and effect a fluid-tight connection. The prior art inserts also tend to flex during the molding process, which prevents the insert from forming a flat, fluid-tight sealing surface. This flexibility also limits the practical size of the inserts, since the larger the insert the greater its tendency to flex during the molding process.

In order to overcome the problems of obtaining a fluid-tight seal with a fastening insert molded into a plastic part, it is common to use a sealing gasket between the parts to be joined. Sealing gaskets, however, usually do not provide a surface flat enough to seal effectively.

SUMMARY OF THE INVENTION

It is therefore an object of the present invention to provide an improved fastening insert which will mantain the sealing surface of a molded plastic part in a flat condition so that sealing can be effected even without the use of a gasket, and so that sealing with a gasket can be effected much more reliably.

This and other objects are accomplished by providing a rigid fastening insert adapted to be molded into and embedded in the apertured wall of a molded plastic article. The fastening insert provides a means for fastening an object to the apertured wall so that it communicates through the aperture from one side of the wall to the other. The fastening insert also reinforces the wall and provides a substantially flat, fluid-tight sealing surface around the aperture where the object is to be fastened. The fastening insert comprises a rigid annular base adapted to surround the aperture. Integral with and projecting from the base is a rigid raised rib. Connecting means are secured to the base and rib and are adapted to fasten the object to the wall of the molded plastic article.

DESCRIPTION OF A PREFERRED EMBODIMENT

The fastening insert is molded into a plastic part shown generally at 16. The fastening insert has particular applicability in a plastic fuel tank in a vehicle where, for example, it might facilitate attachment of a fuel level sending unit 17 to the tank, the sending unit having a dip tube 18 which extends into the tank interior through an opening 15. The fastening insert may be incorporated in a plastic part which is made of any type of plastic material, and which is molded by any conventional molding technique, such as a rotational molding or injection molding.

Figure 1:
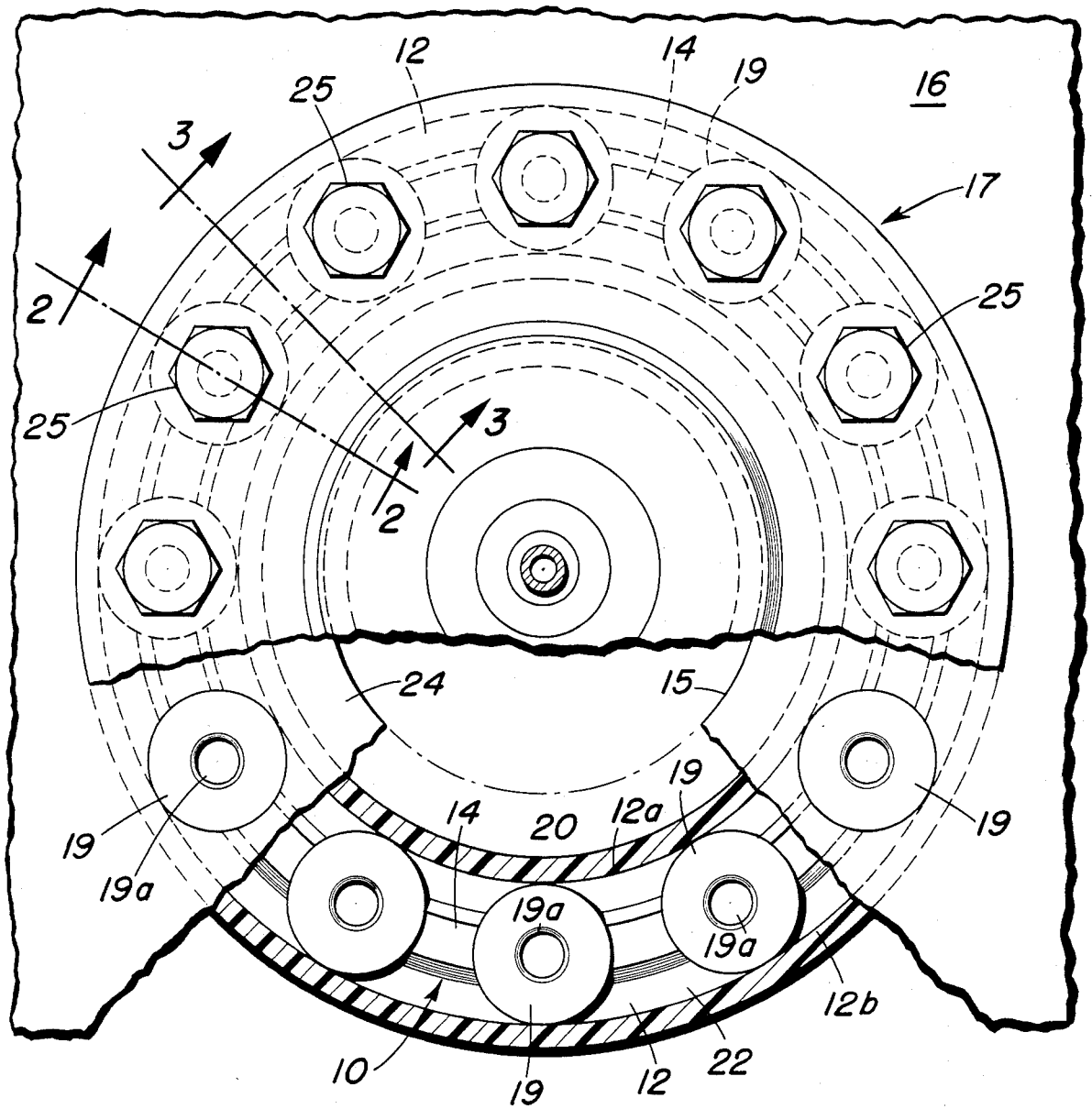
FIG. 1 is a top plan view of a fastening ring insert according to the invention.

The fastening insert indicated generally at 10 includes a flat, annular base portion 12 having an inside edge 12a and an outside edge 12b. A raised rib portion 14 projects axially from the base portion between the inside and outside edges. The junctions of the base 12 and rib 14 form shoulders 20 and 22. The fastening insert in the preferred embodiment is made from an aluminum alloy, although other suitable material may be used as will be commonly known to those skilled in the art. The fastening insert is shown in FIG. 1 as a circle, although it will be obvious that any shape insert can be used according to particular needs.

Figure 2:
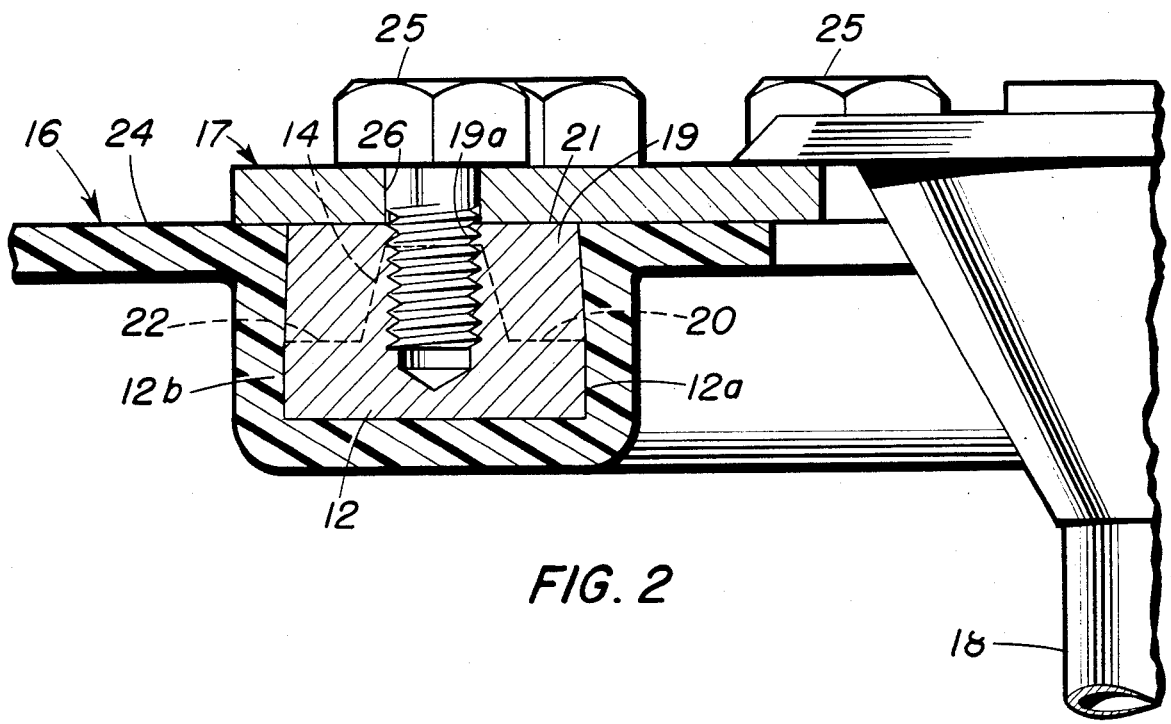
FIG. 2 is a cross-sectional view taken along line 2—2 in FIG. 1.

Positioned around the insert are connectors 19, shown in the preferred embodiment as bosses 19 with threaded blind holes 19a which interrupt rib 14. As shown in FIG. 2, the top flat surfaces 21 of the connectors 19 are flush with the outer surface 24 of the plastic tank 16. Alternatively, the top 21 of each boss 19 can be covered with a thin layer of the plastic material of the molded part, up to the vicinity of the hole 19a. This can be accomplished by securing the fastening insert in the mold with a thin, small-diameter washer interposed between the top 21 of each boss 19 and the inner mold surface. This "covered boss" configuration actually improves sealing because it provides for a substantially continuous plastic surface which will deform substantially uniformly when placed under compression by the fastened sending unit 17. The top surface 28 of rib 14 is recessed below surfaces 21 of bosses 19.

Figure 3:
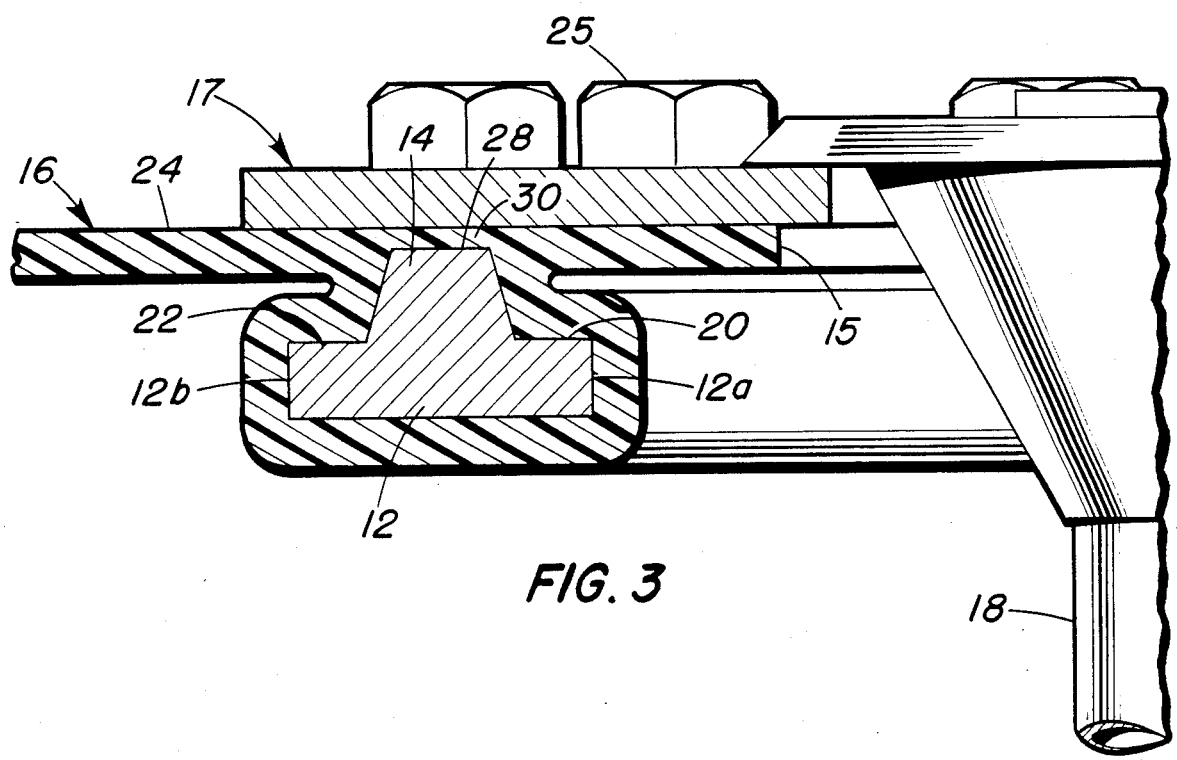
FIG. 3 is a cross-sectional view taken along line 3—3 in FIG. 1.

During molding, the fastening insert 10 is attached by bolts, mating with connectors 19, to the inside surface of the mold. As the plastic tank is formed, the plastic material encapsulates the fastening insert as shown in FIG. 3. The shoulders 20, 22 of the base 12 and rib 14 reinforce the plastic to prevent sagging and shrinking of the plastic after molding is complete. This ensures that the top surfaces 21 of bosses 19 and the outer surface 24 of the plastic tank form a flat surface capable of effecting a fluid-tight seal, with or without a gasket, when the container is fastened to another object, such as sending unit 17. Of course, seaing will be enhanced by the interposition of a gasket, since "cold flow" of the plastic material may result in deformation which causes leakage in the absence of a gasket. Fastening is accomplished by threaded bolts 25 which pass through holes 26 in the mounting flange of sending unit 17 and engage threaded holes 19a.

The rib portion 14 of the fastening insert does not extend to the outer surface 24 of the plastic container, as shown in FIG. 3, but is recessed below surface 24. The depth of this recess should be about ¼ to ½ the thickness of the adjacent wall of the molded part. The depth depends on the plastic material used and the molding process, and is largely a function of the viscosity of the material during plastic flow. The average overall height of the rib 14 is, in the preferred embodiment, about 2½ times the thickness of the wall of the plastic part in which the insert is molded. Thus, the plastic material fully covers the rib as shown at 30. Shoulders are formed between the top surface 28 of rib 14 and the adjacent sides of bosses 19. These shoulders provide additional stability to prevent the sagging and shrinking of the plastic material during the curing process. The actual dimensions of the insert, the height of the rib and the extent of the recess will, of course, vary to suit particular applications.

Various modifications of the invention disclosed and claimed herein will be readily apparent to those skilled in the art. For example, the shape of the fastening insert may be modified to suit the particular needs for which it will be used; the shape of the rib 14, shown herein with tapered sides, could be differently configured; the method by which the insert is molded into the plastic part may be any conventional method known in the art; the insert may be made of any suitable material; and various forms of connectors may be used, all without departing from the scope of the invention which is defined by the following claims.

What is claimed is:

1. A rigid fastening insert adapted to be molded into and embedded in the apertured wall of a molded plastic article, for fastening an object to the wall so that it communicates through the aperture from one side of the wall to the other, and reinforcing the wall to provide a substantially flat, fluid-tight sealing surface around the aperture where the object is to be fastened, said fastening insert comprising:
   a rigid annular base adapted to surround the aperture;
   a rigid raised rib integral with and projecting axially from said base; and
   connecting means secured to said base and said rib and adapted to fasten the object to the wall.

2. In a molded plastic article having an apertured wall adapted to be fastened to an object which communicates through the aperture from one side of the wall to the other, an improved fastening insert molded into and embedded in said wall for fastening an object to and reinforcing said wall to provide a substantially flat, fluid-tight sealing surface around said aperture where the object is to be fastened, said fastening insert comprising:
   a rigid annular base surrounding said aperture;
   a rigid raised rib integral with and projecting axially from said base; and
   connecting means secured to said base and said rib and adopted to fasten the object to said wall.

3. A fastening insert according to claim 1 or 2 wherein said rib is narrower than said base.

4. A fastening insert according to claim 3 wherein said base has inner and outer edges, and said rib projects axially from said base between said edges.

5. A fastening insert according to claim 4 wherein said rib is wider adjacent said base than it is at a distance from said base.

6. A fastening insert according to claim 5 wherein said connecting means comprises a plurality of spaced, axially-projecting connectors which extend further from said base than said rib extends from said base.

7. A fastening insert according to claim 1 or 2 wherein said rib is wider adjacent said base than it is at a distance from said base.

8. A fastening insert according to claim 7 wherein said connecting means comprises a plurality of spaced, axially-projecting connectors which extend further from said base than said rib extends from said base.

9. A fastening insert according to claim 1 or 2 wherein said connecting means comprises a plurality of spaced, axially-projecting connectors which extend further from said base than said rib extends from said base.

10. A fastening insert according to claim 9 wherein said connectors comprise bosses which are integral with said base and said rib.

11. A fastening insert according to claim 10 wherein each of said bosses has a blind, threaded hole which opens to the axial end surface of said boss.

12. A rigid fastening insert adapted to be molded into and embedded in the apertured wall of a molded plastic article, for fastening an object to the wall so that it communicates through the aperture from one side of the wall to the other, and reinforcing the wall to provide a substantially flat, fluid-tight sealing surface around the aperture where the object is to be fastened, said fastening insert comprising:
   a rigid annular base adapted to surround the aperture, said base having inner and outer edges;
   a rigid raised rib integral with and projecting axially from said base between said inner and out edges, said rib being wider adjacent said base than it is at a distance from said base; and
   connecting means adapted to fasten the object to the wall, said connecting means comprising a plurality of spaced, axially-projected bosses integral with said base and said rib, each of said bosses having an axial end surface which is adapted to be flush with the surface of the wall when the insert in molded into and embedded in the wall, said bosses extending further from said base than said rib extends from said base so that said rib will be fully embedded in the wall.

13. A fastening insert according to claim 12 formed of metallic material.

14. A fastening insert according to claim 13 formed of an aluminum alloy.

* * * * *